United States Patent
Mao

(10) Patent No.: US 9,824,270 B1
(45) Date of Patent: Nov. 21, 2017

(54) SELF-LEARNING RECEIPT OPTICAL CHARACTER RECOGNITION ENGINE

(71) Applicant: Joseph Wenhao Mao, Sunnyvale, CA (US)

(72) Inventor: Joseph Wenhao Mao, Sunnyvale, CA (US)

(73) Assignee: Intuit Inc., Mountain View, CA (US)

(*) Notice: Subject to any disclaimer, the term of this patent is extended or adjusted under 35 U.S.C. 154(b) by 355 days.

(21) Appl. No.: 14/611,079

(22) Filed: Jan. 30, 2015

(51) Int. Cl.
*G06K 9/00* (2006.01)
*G06K 9/18* (2006.01)
*G06K 9/62* (2006.01)

(52) U.S. Cl.
CPC ........... *G06K 9/00469* (2013.01); *G06K 9/18* (2013.01); *G06K 9/6262* (2013.01)

(58) Field of Classification Search
CPC ..... G06K 9/00469; G06K 9/18; G06K 9/6262
See application file for complete search history.

(56) References Cited

U.S. PATENT DOCUMENTS

| | | | | |
|---|---|---|---|---|
| 2007/0143398 A1* | 6/2007 | Graham | G06Q 40/02 709/204 |
| 2010/0306080 A1* | 12/2010 | Trandal | G06Q 10/10 705/26.8 |
| 2011/0125561 A1* | 5/2011 | Marcus | G06Q 20/32 705/14.15 |
| 2012/0010930 A1* | 1/2012 | Langdon | G06Q 30/0207 705/14.16 |
| 2012/0072280 A1* | 3/2012 | Lin | G06Q 30/0246 705/14.45 |
| 2012/0239481 A1* | 9/2012 | Yankovich | G06Q 30/0207 705/14.25 |
| 2013/0232041 A1* | 9/2013 | Nuggehalli | G06Q 10/105 705/30 |
| 2014/0079294 A1* | 3/2014 | Amtrup | G06K 9/00469 382/112 |
| 2014/0214652 A1* | 7/2014 | Zheng | G06Q 20/227 705/39 |
| 2015/0227785 A1* | 8/2015 | Wada | G06Q 20/387 382/182 |
| 2016/0189314 A1* | 6/2016 | Nakayama | G06Q 40/12 705/30 |

\* cited by examiner

*Primary Examiner* — Gregory M Desire
(74) *Attorney, Agent, or Firm* — Osha Liang LLP

(57) ABSTRACT

A method for receipt processing using optical character recognition (OCR). The method includes detecting, within a receipt image, a pre-determined characteristic of the receipt, obtaining an OCR receipt template based on the pre-determined characteristic of the receipt, extracting, based on at least the OCR receipt template, a vendor attribute from the receipt image corresponding to a pre-defined field of the receipt, verifying, based on matching the vendor attribute to a vendor associated with the OCR receipt template, that the receipt is generated by the vendor and that the OCR receipt template is applicable to perform the OCR of the receipt image, and generating, in response to the verifying, a textual content of the receipt by processing the receipt image based at least on the OCR receipt template.

24 Claims, 5 Drawing Sheets

SELF-LEARNING RECEIPT OPTICAL CHARACTER RECOGNITION ENGINE

BACKGROUND

Optical recognition (OCR) refers to conversion of an image of a physical (e.g., typewritten or printed) document into machine-encoded text characters. The collection of converted machine-encoded text characters is referred to as a textual content of the physical document. The textual content may be un-structured without any specific format, or structured based on a pre-determined format of the physical document. As used herein, the term "format" refers to a specification of pre-defined field(s) of the physical document and associated locations within the physical document.

An optical recognition (OCR) engine is a software and/or hardware tool used to extract the structured textual content from a document image that mimics the physical document. Generally, the OCR engine requires an OCR template that specifies a relationship between location(s) on a particular type of physical document and pre-defined field(s) of the particular type of physical document. Based on the OCR template, the OCR engine extracts a value for each of the pre-defined fields from a corresponding location within the document image. For example, the OCR engine for a check requires the information indicating where the MICR (i.e., Magnetic Ink Character Recognition) number is located on different types of check to generate an accurate structured textual content for each type of check. In another example, many OCR engines for processing receipts rely on some level of manual user intervention because receipts have very different formats for different vendors.

SUMMARY

In general, in one aspect, the invention relates to a method for receipt processing using optical character recognition (OCR). The method includes detecting, by a computer processor and within a receipt image of a receipt, a pre-determined characteristic of the receipt, obtaining an OCR receipt template based on the pre-determined characteristic of the receipt, wherein the OCR receipt template specifies a relationship between a plurality of locations on the receipt and a plurality of pre-defined fields of the receipt, extracting, by the computer processor and based on at least the OCR receipt template, a vendor attribute from a portion of the receipt image, wherein the portion of the receipt image corresponds to a pre-defined field of the plurality of pre-defined fields of the receipt, verifying, by the computer processor and based on matching the vendor attribute to a vendor associated with the OCR receipt template, that the receipt is generated by the vendor and that the OCR receipt template is applicable to perform the OCR of the receipt image, and generating, in response to the verifying, a textual content of the receipt by processing the receipt image based at least on the OCR receipt template, wherein the textual content comprises a plurality of machine-encoded text characters.

In general, in one aspect, the invention relates to a system for receipt processing using optical character recognition (OCR). The system includes a processor of a computer server, an optical character recognition (OCR) receipt template selector executing on the processor and configured to select a vendor from a plurality of vendors by matching a portion of a receipt image to one of a plurality of vendor identifiers corresponding to the plurality of vendors, wherein the receipt image corresponds to a receipt generated by one of the plurality of vendors, determine a first location match between the portion within the receipt image and a vendor identifier field of an OCR receipt template associated with the vendor, wherein the OCR receipt template comprises a relationship between a plurality of locations on the receipt and a plurality of pre-defined fields of the receipt, and verify, based on the first location match, that the OCR receipt template is applicable to perform the OCR of the receipt image, an OCR module configured to generate, in response to the verifying, a textual content of the receipt by processing the receipt image based at least on the OCR receipt template, and a repository coupled to the processor and configured to store the OCR receipt template.

In general, in one aspect, the invention relates to a non-transitory computer readable medium storing instructions for receipt processing using optical character recognition (OCR), the instructions when executed by a computer processor performing the method steps of detecting, within a receipt image of a receipt, a pre-determined characteristic of the receipt, obtaining an OCR receipt template based on the pre-determined characteristic of the receipt, wherein the OCR receipt template specifies a relationship between a plurality of locations on the receipt and a plurality of pre-defined fields of the receipt, extracting, based on at least the OCR receipt template, a vendor attribute from a portion of the receipt image, wherein the portion of the receipt image corresponds to a pre-defined field of the plurality of pre-defined fields of the receipt, verifying, based on matching the vendor attribute to a vendor associated with the OCR receipt template, that the receipt is generated by the vendor and that the OCR receipt template is applicable to perform the OCR of the receipt image, and generating, in response to the verifying, a textual content of the receipt by processing the receipt image based at least on the OCR receipt template, wherein the textual content comprises a plurality of machine-encoded texts.

Other aspects of the invention will be apparent from the following detailed description and the appended claims.

DETAILED DESCRIPTION

Figure 1A:
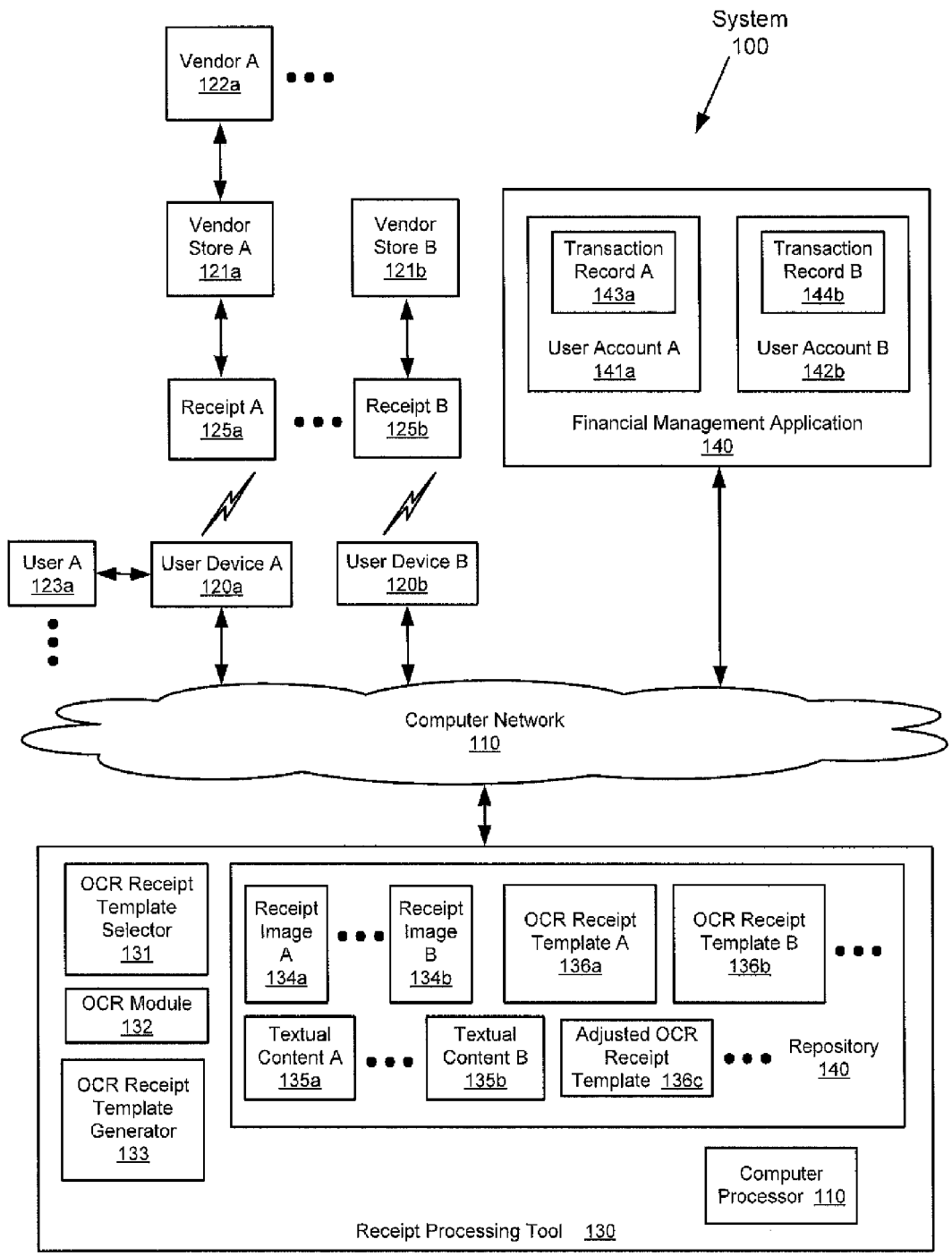
FIGS. 1A and 1B show a schematic diagram of a system of self-learning receipt processing in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention provide a method and a system to generate a textual content of a receipt by selecting and verifying an applicable optical character recognition (OCR) template (referred to as an OCR receipt template). In one or more embodiments, a receipt is a physical document acknowledging that a payment has been received by a vendor from a consumer to complete a purchase of a product or service at a vendor store. For example, the content of the physical document (i.e., receipt) may include a name, logo, and/or other identifier of the vendor, an address and/or postal code of the vendor store, a date of the purchase, an amount of the purchase, a description of the product or service, information regarding the payment method, and other pertinent information regarding the purchase. In particular, these elements of the receipt content correspond to pre-defined fields of the receipt. The list of pre-defined fields and associated locations of the pre-defined fields on the receipt is referred to as the receipt format. In one or more embodiments, an OCR receipt template is adjusted in a self-learning process based on user input. For example, the OCR receipt template applicable to a particular receipt format for a vendor store may be adjusted to be applicable to a similar but different receipt format for a different vendor store. In one or more embodiments, a new OCR receipt template is generated in a self-learning process based on inputs from multiple users.

FIG. 1A depicts a schematic block diagram of a system (100) in accordance with one or more embodiments of the invention. In one or more embodiments of the invention, one or more of the modules and elements shown in FIG. 1A may be omitted, repeated, and/or substituted. Accordingly, embodiments of the invention should not be considered limited to the specific arrangements of modules shown in FIG. 1A.

As shown in FIG. 1A, the system (100) includes a receipt processing tool (130) for processing receipts (e.g., receipt A (125a), receipt B (125b), etc.) of the users (e.g., user A (123a)), and a financial management application (FMA) (140) that uses the results of the receipt processing tool (130) to generate transaction records (e.g., transaction record A (143a), transaction record B (143b), etc.) for the users (e.g., user A (123a)). In particular, the receipt A (125a) is generated at the vendor store A (121a) for the user A (123a) by the vendor A (122a). Similarly, the receipt B (125b) is generated at the vendor store B (121b), which may be operated by the same vendor A (122a) or by a different vendor than the vendor A (122a). In one or more embodiments of the invention, information contained in the receipts (e.g., receipt A (125a), receipt B (125b), etc.) are imported into the receipt processing tool (130) and/or the FMA (140) via user devices (e.g., user device A (120a), user device B (120b), etc.). In one or more embodiments, the user devices (e.g., user device A (120a), user device B (120b), etc.), the receipt processing tool (130), and the financial management application (140) are coupled via a computer network (110). For example, the computer network (110) may include a wireless communication network (e.g., a mobile phone network) and wired and/or wireless portions of public and/or private data network, such as wide area networks (WANs), local area networks (LANs), Internet, etc. Further, the receipt processing tool (130) includes a computer processor (110) that is used to perform the actions and functionality described as well as used by repository (140), OCR receipt template selector (131), OCR module (132), and OCR receipt template generator (133) to perform actions and functionality required. In one or more embodiments of the invention, the computer processor (110) as shown in FIG. 1 is essentially the same as computer processor(s) (402) shown in FIG. 4 and described below.

In one or more embodiments of the invention, the user A (123a) is an individual consumer or business consumer. In particular, an individual consumer is a person or group (e.g., family or other organization) that consumes goods and/or services. A business consumer is a business that consumes goods and/or services. As used herein, the user A (123a) is deemed to perform an action when the action is performed on behalf of the user A (123a). For example, an owner, agent, or officer may act on behalf of the user A (123a) to perform an action.

In one or more embodiments of the invention, a vendor (e.g., vendor A (122a), etc.) is an organization engaged in the trade of goods, services, or both to consumers. For example, the vendor may be a sole proprietorship, partnership, company, non-profit organization, etc. In one or more embodiments of the invention, the vendor A (122a) has a storefront located in at least one geographical location, such as the vendor store A (121a), vendor store B (121b), etc. In one or more embodiments of the invention, the goods and/or services sold by the vendor A (122a) correspond to the products sold by the vendor to the consumers.

In one or more embodiments of the invention, the vendor A (122a) includes functionality to perform one or more financial transactions with one or more users (e.g., user A (123a), etc.). A financial transaction is the exchange of a product for payment. A financial transaction may be a sale of a product, a return of a product, a down payment on a product, or any other exchange of products that involve finances. Generally, a financial transaction is represented by a transaction record (e.g., transaction record A (143a), transaction record B (143b), etc.). In one or more embodiments, the transaction record is recorded information regarding the financial transaction. Each transaction record includes a transaction description of the financial transaction. In one or more embodiments, the transaction description of the financial transaction is included in a receipt of the financial transaction. For example, the transaction description may include a name and/or other identifier of the vendor, an address and/or postal code of the vendor store, a date of the purchase, an amount of the purchase, a description of the purchased product or service, information regarding the payment method, and other pertinent information regarding the purchase.

In one or more embodiments of the invention, the FMA (140) is a set of software solutions designed to manage financial transactions and other financial needs of the users (e.g., user A (123a), etc.). In one or more embodiments of the invention, the FMA (140) may be a personal financial software, a tax preparation application, or any other financial management application. In one or more embodiments, the FMA (140) is provided by an application service provider, such as a software as a service (SaaS). For example, the FMA (140) may be operated by the application service provider (ASP) and accessed by the users (e.g., user A (123a), etc.) on a subscription basis. In one or more embodiments, the FMA (140) retrieves the transaction records (e.g., transaction record A (143a), transaction record B (143b), etc.) from financial institutions (e.g., bank, credit card service provider, etc.) used by the users (e.g., user A (123a), etc.). Further, the FMA (140) obtains additional transaction records (e.g., transaction record A (143a), transaction record B (143b), etc.) from the receipt processing tool (130). In one or more embodiments, the transaction records (e.g., transaction record A (143a), transaction record B (143b), etc.) are organized based on user accounts (e.g., user account A (143a) for user A (123a), user account B (142b), etc.) maintained by the FMA (140).

In one or more embodiments of the invention, digital images (e.g., receipt image A (134a), receipt image B (134b), etc.) of the receipts (e.g., receipt A (125a), receipt B (125b), etc.) are captured using the user devices (e.g., user device A (120a), user device B (120b), etc.) and processed by the receipt processing tool (130) to extract corresponding contents (e.g., textual content A (135a), textual content B (135b), etc.). For example, the receipt image A (134a) and the textual content A (135a) are generated from the receipt A (125a). Similarly, the receipt image B (134b) and the textual content B (135b) are generated from the receipt B (125b). In one or more embodiments, the receipt image A (134a) and receipt image B (134b) correspond to graphic image data organized in any appropriate data format. In other words, no textual data (e.g., alphanumeric data) is included in the receipt image A (134a) and receipt image B (134b). In contrast, the textual content A (135a) and textual content B (135b) include textual data (e.g., alphanumeric data) of transaction description listed on the receipt A (125a) and receipt B (125b). For example, the textual content A (135a) may include a name and/or other identifier of the vendor A (122a), an address and/or postal code of the vendor store A (121a), a date of the purchase, an amount of the purchase, a description of the purchased product or service, information regarding the payment method, and other pertinent information regarding the purchase. These various elements of the textual content A (135a) correspond to pre-defined field(s) of the receipt A (125a).

In one or more embodiments of the invention, the user devices (e.g., user device A (120a), user device B (120b), etc.) correspond to any device capable of capturing a graphical image from a physical document, such as a receipt. For example, the user devices (e.g., user device A (120a), user device B (120b), etc.) may include a mobile device equipped with a camera (e.g., a smartphone, a tablet computer, a notebook computer, etc.) or a document scanner installed in an office. In one or more embodiments, the user A (123a) is a consumer receiving the receipt A (125a) while making a purchase at the vendor store A (121a). Accordingly, the user A (123a) captures the receipt image A (134a) using the user device A (120a) (e.g., a smartphone) at or near the vendor store A (121a). As a result, the receipt image A (134a) may include, or otherwise be tagged with metadata identifying the geo-location of the vendor store A (121a). In one or more embodiments, the user A (123a) is an accountant who uses an office scanner to scan a batch of receipts submitted by various clients of the accountant user. In particular, the batch of receipts corresponds to purchases made by the various clients at various vendor stores, such as the vendor store A (121a), vendor store B (121b), etc.

In one or more embodiments of the invention, the receipt processing tool (130) includes an OCR receipt template selector (131), an OCR module (132), an OCR receipt template generator (133), and a repository (140) storing data used and/or generated by these components of the receipt processing tool (130). In one or more embodiments, the repository (140) may include a disk drive storage device, a semiconductor storage device, a database management system, other suitable computer data storage device, or combinations thereof. In one or more embodiments, content stored in the repository (140) may be a data file, a linked list, a data sequence, a database, a graphical representation, or any other suitable data structure. Other components of the receipt processing tool (130) are described in detail below.

In one or more embodiments, the OCR receipt template selector (131) is configured to select and verify an OCR receipt template (e.g., OCR receipt template A (136a), OCR receipt template B (136b), etc.) for processing receipt images (e.g., receipt image A (134a), receipt image B (134b), etc.). In one or more embodiments, the OCR receipt template includes a list of pre-defined field(s) of a receipt and physical layout data that specifies a relationship between location(s) on the receipt and the pre-defined field(s) of the receipt. A pre-defined field of the receipt (e.g., receipt A (125a)) may correspond to a text portion (referred to as a text block) or a graphics portion (referred to as a graphics block) of the receipt image (e.g., receipt image A (134a). For example, a text block may correspond to a vendor name or address, while a graphics block may correspond to a vendor logo. In one or more embodiments, the locations on the receipt are mathematically represented in the OCR receipt template as coordinates and dimensions. For example, the coordinates and dimensions may be based on a pre-determined origin and scale specific to the OCR receipt template. An example of the receipt image A (134a) and the OCR receipt template A (136a) is described in reference to FIG. 1B below.

Figure 1B:
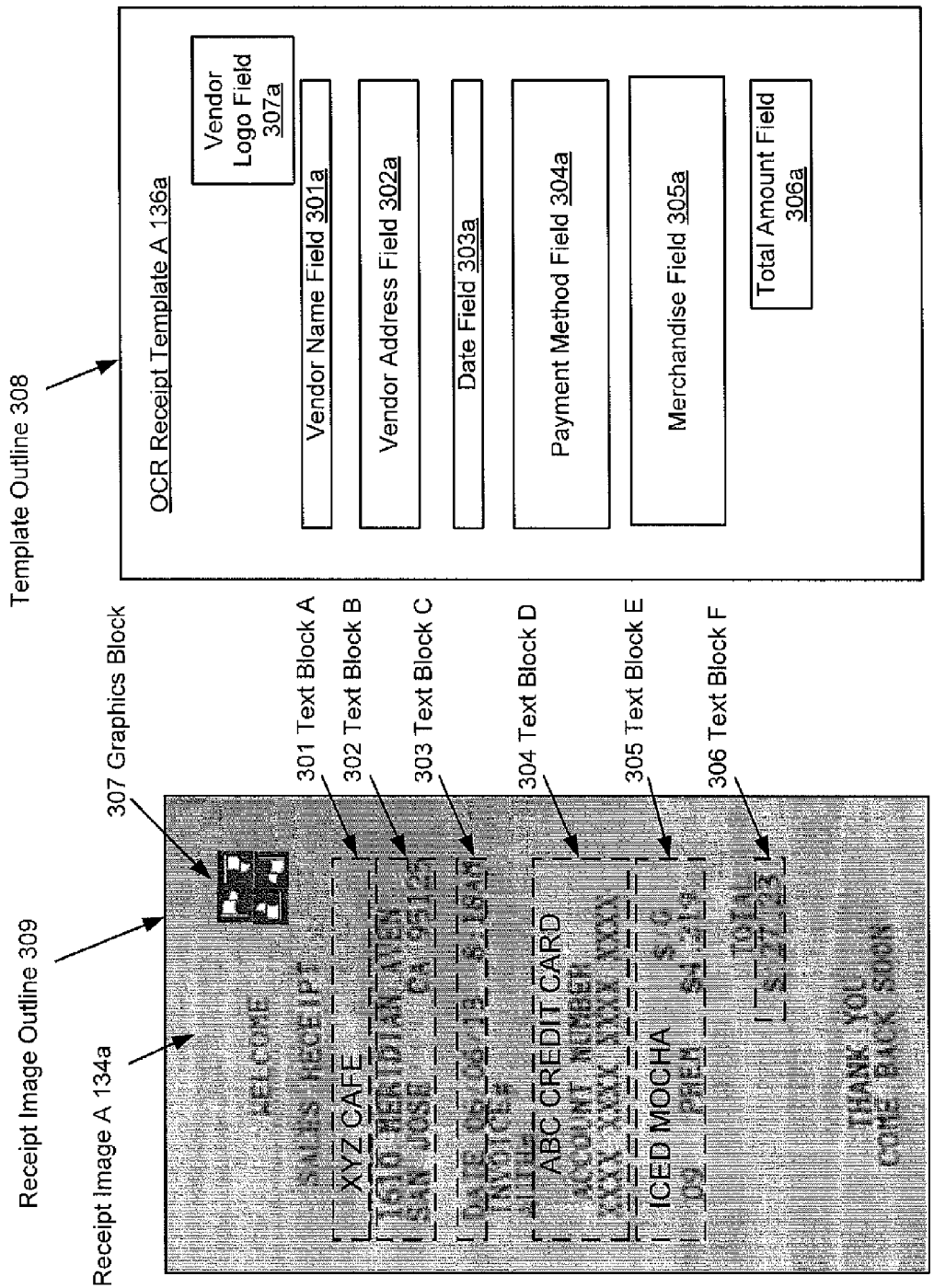

FIG. 1B shows an example of details of the receipt image A (134a) and the OCR receipt template A (136a) depicted in FIG. 1A above. As shown in FIG. 1B, the receipt image A (134a) includes various portions identified as the text block A (301), text block B (302), text block C (303), text block D (304), text block E (305), text block F (306), and graphics block (307). Each of these portions corresponds to a particular location marked by a dashed rectangle within the receipt image A (134a). In addition, the receipt image A (134a) includes a receipt image outline (309) corresponding to the border of the receipt image A (134a), and other unmarked portions. Performing OCR of the receipt image A (134a) without any OCR template results in the unstructured textual content of "WELCOME SALES RECEIPT XYZ CAFE, 1610 MERIDIAN AVEN SAN JOSE CA95125 DATE 06/06/13 8:18 AM INVOICE# AUTH# ABC CREDIT CARD ACCOUNT NUMBER XXXX XXXX XXXX XXXX ICED MOCHA $/G 09 PREM $4.219 TOTAL 6.453 $27.23. THANK YOU COME BACK SOON." In one or more embodiments, the unstructured textual content is associated/tagged with location metadata describing locations (e.g., coordinates and dimensions) of each text character in the unstructured textual content.

Further as shown in FIG. 1B, the OCR receipt template A (136a) is represented as a graphical layout listing various pre-defined fields of the receipt A (125a), such as the vendor name field B (301a), vendor address field (302a), date field (303a), payment method field (304a), merchandise field (305a), total amount field (306a), and vendor logo field (307a). Each of these pre-defined fields corresponds to a particular location marked by a solid rectangle within the template outline (308) of the OCR receipt template A (136a). Specifically, the collection of these solid rectangles forms the graphical layout of the OCR receipt template A (136a). Accordingly, the OCR receipt template A (136a) specifies, in the graphical layout format, the relationship between various locations on the receipt A (125a) and the pre-defined fields of the receipt A (125a). In one or more embodiments, the dimensions of the template outline (308) and the receipt image outline (309) are compared to correlate locations of the pre-defined fields on the receipt to locations of the text and graphics blocks in the receipt image. For example, the correlation may be based on a scaling factor determined by comparing the dimensions of the template outline (308) and the receipt image outline (309).

Performing OCR of the receipt image A (134a) based on the OCR receipt template A (136a) results in the structured textual content that indicates the vendor name as "XYZ CAFE," the vendor address as "1610 MERIDIAN AVEN SAN JOSE CA95125," the date as "06/06/13," the payment method as "ABC CREDIT CARD ACCOUNT NUMBER XXXX XXXX XXXX XXXX," the merchandise as "ICED MOCHA $/G 09 PREM $4.219," and total amount as "$27.23."

Although the OCR receipt template A (136a) is represented in a graphical layout in the example shown in FIG. 1B, one skilled in the art will appreciate that OCR receipt template A (136a) may also be represented in other formats, such as a alphanumeric list of the pre-defined fields associated with mathematical coordinates and dimensions of the solid rectangles shown in FIG. 1B.

Returning to the discussion of FIG. 1A, the OCR receipt template selector (131) is configured to detect a vendor identifier (e.g., name, logo, etc.) of the vendor A (122a) within the receipt image A (134a) to identify that the receipt image A (134a) is generated by the vendor A (122a). Accordingly, the OCR receipt template selector (131) selects the OCR receipt template A (136a) associated with the vendor A (122a) from a collection of OCR receipt templates (e.g., OCR receipt template A (136a), OCR receipt template B (136b), etc.) corresponding to a number of vendors (e.g., vendor A (122a), etc.). In one or more embodiments, the OCR receipt template B (136b) is associated with a different vendor separate from the vendor A (122a). In one or more embodiments, the OCR receipt template selector (131) uses the method described in reference to FIG. 2 to select and verify the OCR receipt template A (136a) for processing the receipt image A (134a), and select and verify the OCR receipt template B (136b) for processing the receipt image B (134b).

In one or more embodiments, the OCR module (132) is configured to generate a textual content (e.g., textual content (135a), textual content B (135b), etc.) of a receipt (e.g., receipt A (125a), receipt B (125b), etc.) by processing the receipt image (e.g., receipt image A (134a), receipt image B (134b), etc.) based on an OCR receipt template (e.g., OCR receipt template A (136a), OCR receipt template 13 (136b), etc.) selected by the OCR receipt template selector (131). In one or more embodiments, the textual content (135a) and textual content B (135b) are reformatted, or otherwise modified into the transaction record A (143a) and transaction record B (143b) for providing to the FMA (140).

In one or more embodiments, the OCR receipt template generator (133) is configured to adjust an OCR receipt template (e.g., OCR receipt template A (136a), OCR receipt template B (136b), etc.) to generate an adjusted OCR receipt template (e.g., adjusted OCR receipt template (136c), etc.) using a self-learning method. In one or more embodiments, the vendor store A (121a) and vendor store B (121b) are operated by the same vendor A (122a) but use similar and yet different receipt formats based on different aspects of the two stores, such as geographical locations or franchise owners. Although both receipt formats include the same logo of the vendor A (122a), the layout of other fields in the receipt is different. As a result, while the OCR receipt template A (136a) is successfully used to process the receipt image A (124a), errors occur when the OCR receipt template A (136a) is used to process the receipt image B (124b). In one or more embodiments, the self-learning method described in reference to FIG. 2 below is used to adjust the OCR receipt template A (136a) and generate the adjusted OCR receipt template (136c) for processing the receipt image B (124b) without error. In one or more embodiments, the OCR receipt template generator (133) is further configured to generate a new OCR receipt template using the self-learning process based on inputs from multiple users. An example of generating the new OCR receipt template using the self-learning process is described in reference to FIG. 3B below.

Figure 2:
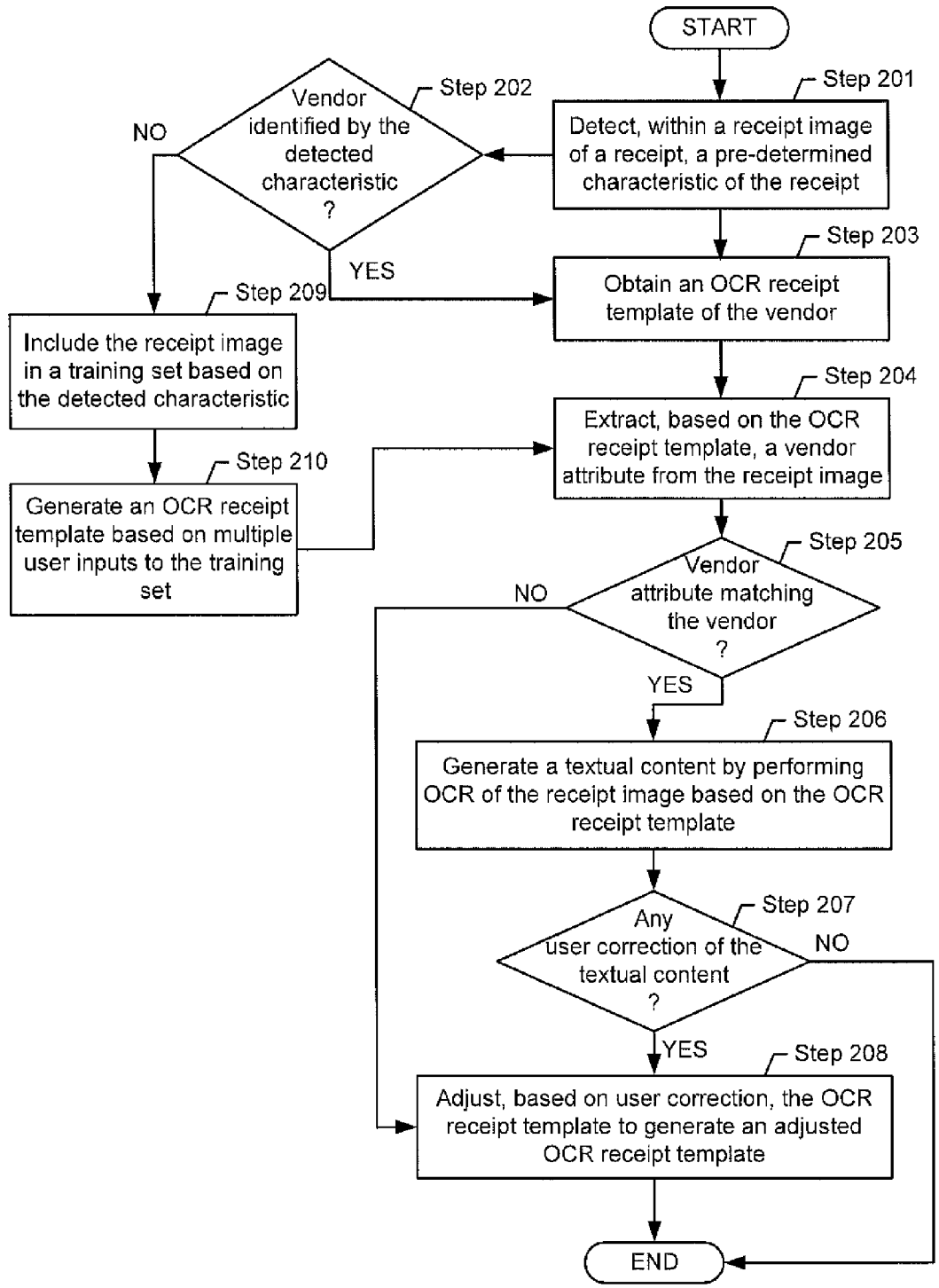
FIG. 2 shows a flowchart of a method of self-learning receipt processing in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100) described in reference to FIG. 1A above.

Initially in Step 201, a pre-determined characteristic of a receipt is detected within a receipt image of the receipt. In one or more embodiments, the pre-determined characteristic of the receipt includes a name or a logo of the vendor. For example, any receipt generated by the vendor always includes the name or logo of the vendor. The name of the vendor may be detected from a non-structured textual content extracted from the receipt image by performing OCR without any OCR template.

In one or more embodiments, the pre-determined characteristic of the receipt includes a location pattern of one or more pre-defined fields of the receipt, such as a date field, a currency amount field, and/or a postal code field. For example, any receipt generated by the vendor always includes the date, currency amount, and/or postal code at particular location(s) on the receipt. The non-structured textual content extracted from the receipt image may be parsed based on common format of the date, currency amount, and/or postal code to determine the location pattern.

In Step 202, a determination is made as to whether a vendor is identified by the detected characteristic of the receipt, as the vendor that generated the receipt. If the determination is positive, i.e., the vendor that generated the receipt is identified by the detected characteristic of the receipt, the method proceeds to Step 203. Otherwise, if the determination is negative, i.e., the vendor that generated the receipt cannot be identified by the detected characteristic of the receipt, the method proceeds to Step 209.

In Step 203, an OCR receipt template is obtained based on the pre-detected characteristic of the receipt. In one or more embodiments, the OCR receipt template is selected from a collection of OCR receipt templates associated with a set of vendors.

In Step 204, a vendor attribute is extracted from a portion of the receipt image based on the OCR receipt template. Specifically, the portion of the receipt image corresponds to a pre-defined field of the receipt, where the location of the portion on the receipt image is specified by the OCR receipt template. In particular, the pre-defined field is for describing, on the receipt, the vendor attribute. For example, the vendor attribute may include the logo, address, and/or postal code of the vendor.

In Step 205, a determination is made as to whether the vendor attribute extracted in Step 204 matches the vendor identified in Step 202. In one or more embodiments, information of the vendor identified in Step 202 is obtained from a third party online source (e.g., a search engine or online directory) for comparing with the vendor attribute. For example, the search engine or online directory may provide information relating to the logo, address, and/or postal code of the vendor.

If the determination in Step 205 is positive, i.e., the vendor attribute matches the vendor, the match is considered as a verification that the receipt is indeed generated by the vendor and that the OCR receipt template is applicable to perform the OCR of the receipt image. Accordingly, the method proceeds to Step 206. Otherwise, if the determination is negative, i.e., the vendor attribute and the vendor do not match, the method proceeds to Step 208.

In Step 206, a textual content of the receipt (e.g., a collection of converted machine-encoded text characters) is generated by processing the receipt image based on the OCR receipt template. In one or more embodiments, the textual content of the receipt is provided to a financial management application and converted into a transaction record of a purchase associated with the receipt. For example, the transaction record may be incorporated into an accounting report generated by the financial management application.

In Step 207, a determination is made as to whether any user correction is received regarding the textual content. For example, the textual content of the receipt is displayed to a user for approval. If the determination is positive, i.e., the user correction is received, the method proceeds to Step 208. Otherwise, if the determination is negative, i.e., no user correction is received or the user approves the textual content, the method ends.

In Step 208, the OCR receipt template is adjusted based on the user correction to generate an adjusted OCR receipt template. In one or more embodiments, the user correction relates to an incorrect value of a pre-defined field corresponding to an incorrect location that is included in the locations specified by the OCR receipt template. Accordingly, the user correction specifies a correct value of the pre-defined fields. In one or more embodiments, adjusting the OCR receipt template includes identifying a correct location within the receipt image where the correct value is found, and revising, based on the correct location within the receipt image, the incorrect location. In other words, once the user provides the correct value in the user correction, the correct location of the corresponding pre-defined field is automatically determined by matching the correct value to the receipt image without any further user intervention. This method of automatically correcting a pre-defined field location by matching user provided correction to the receipt image is referred to as a self-learning method for adjusting OCR receipt template.

In one or more embodiments, the user correction is among a set of user corrections of textual contents generated from a collection of receipt images, of which the OCR template is verified to be applicable to perform the OCR. Because receipt images in the collection may have dimensional variations depending on how each receipt image is captured, the set of user corrections may exhibit statistical variations. Accordingly, a statistical range of the correct location is determined based on the set of user corrections. The statistical range of the correct location is then used to adjust the OCR receipt template by revising the incorrect location on the receipt.

In one or more embodiments, the adjusted OCR receipt template is used for performing OCR of other receipts generated by the vendor, and the method ends. In one or more embodiments, the Step 206 may be repeated based on the adjusted OCR receipt template.

In Step 209, the receipt image, wherein no vendor can be identified, is included into a collection of receipt images to form a training set. In particular, each of the receipt images includes the pre-determined characteristic of the receipt that is detected in Step 201. For example, each of the receipt images in the training has the same location pattern of the date, currency amount, and/or postal code that are identified from non-structured textual contents. While the date and currency amount may vary among the receipt images, the postal code are all the same for all receipt images in the training set.

In Step 210, the OCR receipt template is generated based on a collection of user inputs with respect to the collection of receipt images. For example, each receipt image in the collection may be manually processed by a user who visually identifies the contents of the pre-defined fields of the receipt. In other words, the user may specify the vendor name and address, date, currency amount, etc. by viewing each receipt image. These user identified contents are then automatically matched to the receipt image to determine corresponding locations, which in turn are used to generate the OCR receipt template. In other words, once the user identifies the contents of the pre-defined fields, the location of each pre-defined field is automatically determined without any further user intervention. This method of automatically determining pre-defined field locations by matching user provided contents to the receipt image is referred to as a self-learning method for generating OCR receipt template. Because receipt images in the collection may have dimensional variations depending on how each receipt image is captured, the locations determined from user identified contents may exhibit statistical variations among multiple users. Accordingly, a statistical range of each location is determined by the self-learning method and incorporated into the OCR receipt template. Once the OCR receipt template is generated, the method proceeds to Step 204.

Figure 3:
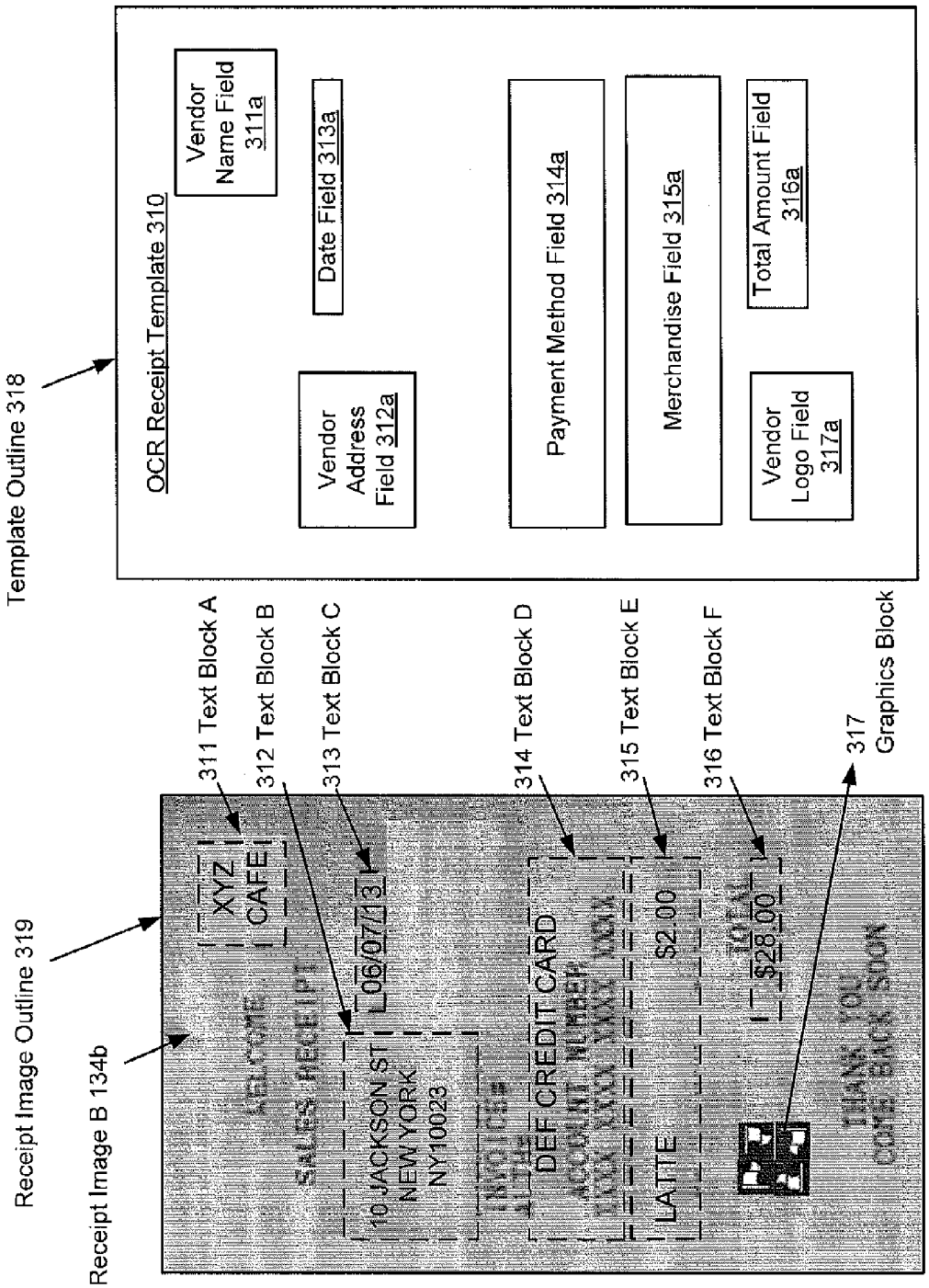
FIG. 3 shows an example of self-learning receipt processing in accordance with one or more embodiments of the invention.

FIG. 3 shows an example of self-learning receipt processing in accordance with one or more embodiments of the invention. In one or more embodiments, the example described in reference to FIG. 3 may be practiced using the system (100) and the self-learning method described in reference to FIG. 1A and FIG. 2 above. Specifically, FIG. 3 shows an example of details of the receipt image B (134b) depicted in FIG. 1A above, and an OCR receipt template (310) generated from the receipt image B (134b) using the self-learning method.

As shown in FIG. 3, the receipt image B (134b) includes various portions identified as the text block A (311), text block B (312), text block C (313), text block D (314), text block E (315), text block F (316), and graphics block (317). Each of these portions corresponds to a particular location marked by a dashed rectangle within the receipt image B (134b). In addition, the receipt image B (134b) includes a receipt image outline (319) corresponding to the border of the receipt image B (134b), and other unmarked portions. Performing OCR of the receipt image B (134b) without any OCR template results in the unstructured textual content of "WELCOME XYZ CAFE SALES RECEIPT 10 JACKSON ST 06/07/13 NEW YORK NY10023 INVOICE# AUTH# DEF CREDIT CARD ACCOUNT NUMBER XXXX XXXX XXXX XXXX LATTE $2.00 TOTAL $28.00. THANK YOU COME BACK SOON." Further, the unstructured textual content is associated/tagged with location metadata describing locations (e.g., coordinates and dimensions) of each text character in the unstructured textual content.

In a first example scenario, XYZ CAFE operates a national chain of coffee shop stores. In particular, the receipt image B (134b) is captured from a receipt generated by a store operated by XYZ CAFE in New York. In comparison, the receipt image A (134a) depicted in FIG. 1B above is captured from another receipt generated from another store operated by XYZ CAFE in San Jose. While these two receipts have similar formats, the locations of the vendor name field, vendor address field, date field, and vendor logo field are different on the two receipts. For example, receipts generated by the New York store always have the vendor name listed on the top right corner of each receipt, while receipts generated by the San Jose store always have the vendor name listed on a different part of each receipt.

Initially, only the OCR receipt template A (136a) applicable to the San Jose store receipts is maintained by the receipt processing tool (130). When the vendor name "XYZ CAFE" is detected from the receipt image B (134b) (e.g., from the aforementioned unstructured textual content) and used as the search keyword to retrieve a store location list from a website of the XYZ CAFE, the New York store address and zip code are verified. Accordingly, the OCR receipt template A (136a) is used to perform OCR of the receipt image B (134b). By applying the OCR receipt template A (136a) depicted in FIG. 1B to the receipt image B (134b) depicted in FIG. 3, the OCR generates the structured textual content having an incorrect vendor name "10 JACKSON ST 06/07/13", incorrect address "NEW YORK", and incorrect date "NY10023" based on the vendor name field (301a), vendor address field (302a), and date field (303a) of the OCR receipt template A (136a). As a result, the user corrects the OCR result by changing the incorrect vendor name "10 JACKSON ST 06/07/13" to "XYZ CAFE", changing the incorrect address "NEW YORK" to "10 JACKSON ST 06/07/13 NEW YORK NY10023", and changing the incorrect date "NY10023" to "06/07/13". Based on these user corrections, the receipt processing tool (130) determines the locations of the text block A (311), text block B (312), and text block C (313) on the receipt image B (134b) where the user corrected vendor name, address, and date are found, e.g., based on the aforementioned location metadata. These locations are used to adjust the vendor name field (301a), vendor address field (302a), and date field (303a) of the OCR receipt template A (136a) to user corrected locations for generating the OCR receipt template (310). Specifically, the vendor name field (311a), vendor address field (312a), and date field (313a) of the OCR receipt template (310) correspond to the text block A (311), text block B (312), and text block C (313) on the receipt image B (134b). Subsequently, both the OCR receipt template A (136a) applicable to the San Jose store receipts and the OCR receipt template (310) applicable to the New York store receipts are maintained by the receipt processing tool (130). For example, when the vendor name "XYZ CAFE" is detected in a receipt image, the location of the vendor name is determined first before the applicable OCR receipt template is selected to perform the OCR. In other words, if the vendor name "XYZ CAFE" is found near the top one third of the receipt image, the OCR receipt template A (136a) is used for performing the OCR. Otherwise, if the vendor name "XYZ CAFE" is found near the top right corner of the receipt image, the OCR receipt template (310) is used for performing the OCR.

In the first example scenario described above, the OCR receipt template (310) is an example of the adjusted OCR receipt template (136c) depicted in FIG. 1A above. In one or more embodiments, the OCR receipt template (310) is finalized as the adjusted OCR receipt template (136c) when statistically consistent user corrections are received from sufficient number of users. The statistically consistent user corrections validate the self-learned vendor name field (311a), vendor address field (312a), and date field (313a) of the OCR receipt template (310).

In a second example scenario, no OCR receipt template is maintained by the receipt processing tool (130) for the vendor "XYZ CAFE". When the vendor name "XYZ CAFE" is detected from the receipt image B (134b) (e.g., from the aforementioned unstructured textual content), the detected information does not identify any vendor or associated OCR receipt template within the receipt processing tool (130). As a result, the user manually processes the receipt image B (134b) to determine the vendor name, address, date, currency amount, etc. for creating a transaction record in the financial management application. Based on these user inputs, the receipt processing tool (130) determines the locations of the text block A (311), text block B (312), and text block C (313) on the receipt image B (134b) where the user provided vendor name, address, date, etc. are found, e.g., based on the aforementioned location metadata. In particular, the locations of the zip code (part of the vendor address) and date are singled out as a location pattern. When sufficient number of manually processed receipt images having the same (within a pre-determined accuracy tolerance, such as 5%) location pattern are accumulated by the receipt processing tool (130), these similar receipt images and associated user provided information are used as a training set to generate the OCR receipt template A (136a) for XYZ CAFE. In the second example scenario described above, the OCR receipt template (310) is an example of the OCR receipt template B (136b) depicted in FIG. 1A above.

Figure 4:
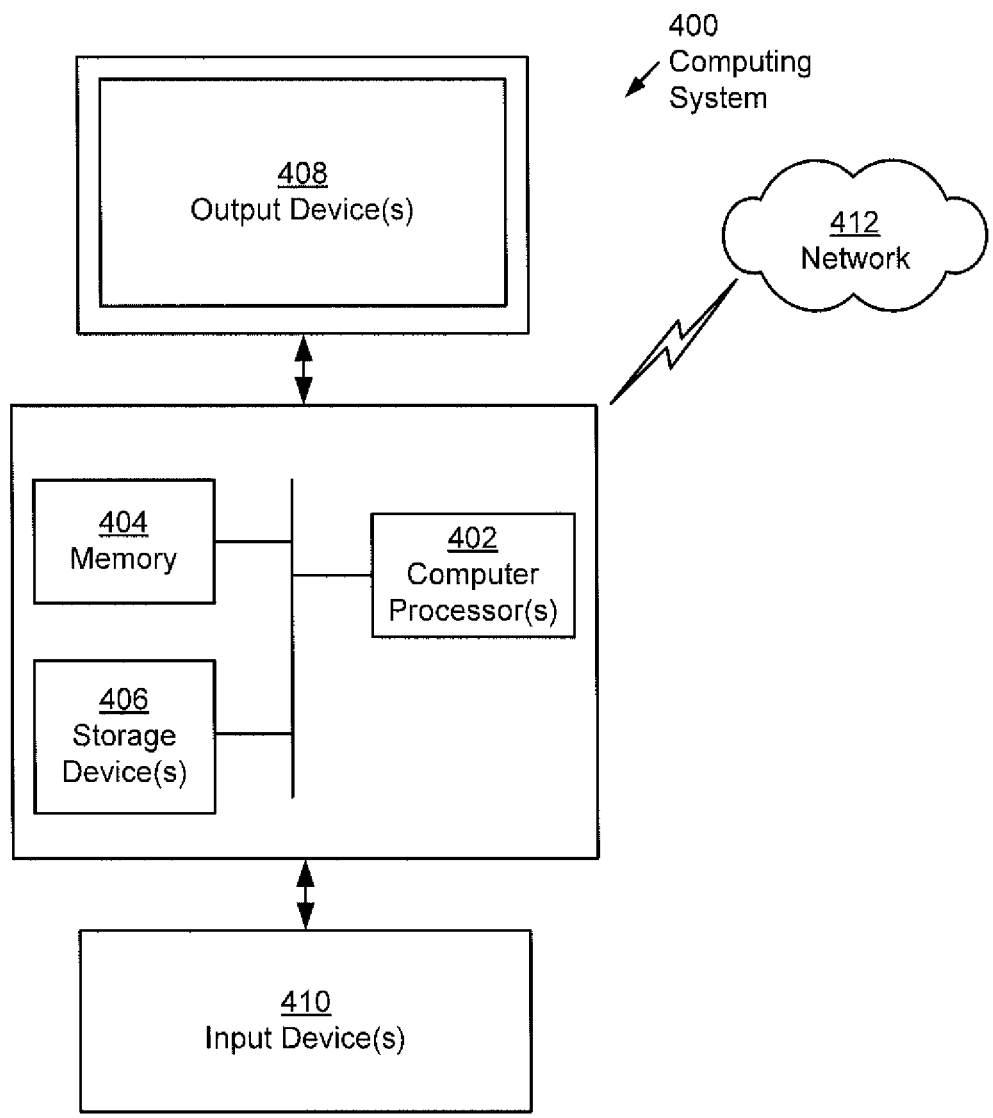
FIG. 4 shows a diagram of a computer system in accordance with one or more embodiments of the invention.

Embodiments of the invention may be implemented on a computing system. Any combination of mobile, desktop, server, embedded, or other types of hardware may be used. For example, the computing system may be one or more mobile devices (e.g., laptop computer, smartphone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for receipt processing using optical character recognition (OCR), comprising:
   detecting, by a computer processor and within a receipt image of a receipt, a pre-determined characteristic of the receipt;
   obtaining an OCR receipt template based on the pre-determined characteristic of the receipt, wherein the OCR receipt template specifies a relationship between a plurality of locations on the receipt and a plurality of pre-defined fields of the receipt;
   extracting, by the computer processor and based on at least the OCR receipt template, a vendor attribute from a portion of the receipt image, wherein the portion of the receipt image corresponds to a pre-defined field of the plurality of pre-defined fields of the receipt;
   verifying, by the computer processor and based on matching the vendor attribute to a vendor associated with the OCR receipt template, that the receipt is generated by the vendor and that the OCR receipt template is applicable to perform the OCR of the receipt image, wherein verifying further comprises:
      obtaining information of the vendor from a third party online source, and
      determining the match by comparing the vendor attribute and the information of the vendor,
      wherein the vendor attribute and the information of the vendor comprise at least one selected from a group consisting of a logo, an address, and a postal code of the vendor; and
   generating, in response to the verifying, a textual content of the receipt by processing the receipt image based at least on the OCR receipt template, wherein the textual content comprises a plurality of machine-encoded text characters.

2. The method of claim 1, wherein the pre-determined characteristic of the receipt comprises at least one selected from a group consisting of a name and a logo of the vendor.

3. The method of claim 1,
   wherein the pre-determined characteristic of the receipt comprises a location pattern of a subset of the plurality of locations on the receipt, and
   wherein the subset of the plurality of locations corresponds to at least one selected from a group consisting of a date field, a currency amount field, and a postal code field of the plurality of pre-defined fields.

4. The method of claim 1,
   wherein the pre-determined characteristic of the receipt identifies none of a plurality of vendors associated with a plurality of OCR receipt templates, and
   wherein obtaining the OCR receipt template based on the pre-determined characteristic of the receipt comprises:
      adding the receipt image into a plurality of receipt images to form a training set, wherein each of the plurality of receipt images comprises the pre-determined characteristic of the receipt, and
      generating the OCR receipt template based on a plurality of user inputs with respect to the plurality of receipt images, wherein the plurality of user inputs identifies the vendor.

5. The method of claim 1, further comprising:
   displaying the textual content of the receipt to a user;
   receiving, from the user and in response to displaying the textual content, a correction of the textual content;
   adjusting, based on the correction, the OCR receipt template to generate an adjusted OCR receipt template; and
   performing the OCR of another generated by the vendor based on the adjusted OCR receipt template.

6. The method of claim 5,
   wherein the textual content comprises an incorrect value of at least one of the plurality of pre-defined fields corresponding to an incorrect location that is included in the plurality of locations specified by the OCR receipt template,
   wherein the correction comprises a correct value of the at least one of the plurality of pre-defined fields, and
   wherein adjusting the OCR receipt template comprises:
      identifying a correct location within the receipt image where the correct value is found, and
      revising, based on the correct location within the receipt image, the incorrect location that is included in the plurality of locations specified by the OCR receipt template.

7. The method of claim 6, further comprising:
   receiving, from a plurality of users, a plurality of corrections of a plurality of textual contents generated from a plurality of receipt images of which the OCR template is verified to be applicable to perform the OCR; and
   determining a statistical range of the correct location based on the plurality of corrections,
   wherein revising the incorrect location on the receipt is further based on the statistical range of the correct location.

8. A system for receipt processing using optical character recognition (OCR), comprising:
   a processor of a computer server;
   an optical character recognition (OCR) receipt template selector executing on the processor and configured to:
      select a vendor from a plurality of vendors by matching a portion of a receipt image to one of a plurality of vendor identifiers corresponding to the plurality of vendors, wherein the receipt image corresponds to a receipt generated by one of the plurality of vendors,
      determine a first location match between the portion within the receipt image and a vendor identifier field of an OCR receipt template associated with the vendor, wherein the OCR receipt template comprises a relationship between a plurality of locations on the receipt and a plurality of pre-defined fields of the receipt, verify, based on the first location match, that the OCR receipt template is applicable to perform the OCR of the receipt image;

extract, prior to processing the receipt image based at least on the OCR receipt template, a store location identifier from the receipt image, wherein the store location identifier identifies a store location where the receipt is generated; and determine that the vendor operates a store at the store location to confirm that the receipt is generated by the vendor, wherein verifying that the OCR receipt template is applicable to perform the OCR of the receipt image is further based on confirming that the receipt is generated by the vendor;

an OCR module configured to:
generate, in response to the verifying, a textual content of the receipt by processing the receipt image based at least on the OCR receipt template; and a repository coupled to the processor and configured to store the OCR receipt template.

9. The system of claim 8, the OCR receipt template selector further configured to:
select the OCR receipt template associated with the vendor from a plurality of OCR receipt templates corresponding to the plurality of vendors.

10. The system of claim 8, further comprising an adjusted OCR receipt template generator executing on the processor and configured to:
display the textual content of the receipt to a user;
receive, from the user and in response to displaying the textual content, a correction of the textual content; and
adjust, based on the correction, the OCR receipt template to generate an adjusted OCR receipt template,
wherein the OCR module is further configured to perform the OCR of another generated by the vendor based on the adjusted OCR receipt template.

11. The system of claim 10,
wherein the textual content comprises an incorrect value of at least one of the plurality of pre-defined fields corresponding to an incorrect location on the receipt that is included in the plurality of locations of the OCR receipt template,
wherein the correction comprises a correct value of the at least one of the plurality of pre-defined fields, and
wherein adjusting the OCR receipt template comprises:
identifying a correct location within the receipt image where the correct value is found; and
revising, based on the correct location within the receipt image, the incorrect location on the receipt that is included in the plurality of locations of the OCR receipt template.

12. The system of claim 11, the adjusted OCR receipt template generator further configured to:
receive, from a plurality of users, a plurality of corrections of a plurality of textual contents generated from a plurality of receipts of which the OCR template is verified to be applicable to perform the OCR; and
determine a statistical range of the correct location based on the plurality of corrections,
wherein revising the incorrect location on the receipt is further based on the statistical range of the correct location.

13. The system of claim 8, the OCR receipt template selector further configured to:
obtain a store location list of the vendor from a third party online source; and
analyze, prior to processing the receipt image based at least on the OCR receipt template, the store location list to determine that the vendor operates the store at the store location.

14. The system of claim 8, the OCR receipt template selector further configured to:
compare, prior to processing the receipt image based at least on the OCR receipt template, a second location of the store location identifier within the receipt image to the OCR receipt template to determine a second location match,
wherein the plurality of pre-defined fields further comprise a store location identifier field, and
wherein verifying that the OCR receipt template is applicable to perform the OCR of the receipt image is further based on the second location match.

15. The system of claim 8, the OCR receipt template selector further configured to:
extract, prior to processing the receipt image based at least on the OCR receipt template, a currency amount from the receipt image; and
compare, prior to processing the receipt image based at least on the OCR receipt template, a third location of the currency amount within the receipt image to the OCR receipt template to determine a third location match,
wherein the plurality of pre-defined fields further comprise a currency amount field, and
wherein verifying that the OCR receipt template is applicable to perform the OCR of the receipt image is further based on the third location match.

16. The system of claim 15, the OCR receipt template selector further configured to:
receive a user input to identify the currency amount, from a plurality of currency amounts extracted from the receipt image, as corresponding to the currency amount field.

17. The system of claim 8, the OCR receipt template selector further configured to:
extract, prior to processing the receipt image based at least on the OCR receipt template, a date from the receipt image; and
compare, prior to processing the receipt image based at least on the OCR receipt template, a fourth location of the date within the receipt image to the OCR receipt template to determine a fourth location match,
wherein the plurality of pre-defined fields further comprises a date field, and
wherein verifying that the OCR receipt template is applicable to perform the OCR of the receipt image is further based on the fourth location match.

18. A non-transitory computer readable medium storing instructions for receipt processing using optical character recognition (OCR), the instructions when executed by a computer processor performing the method steps of:
detecting, within a receipt image of a receipt, a pre-determined characteristic of the receipt;
obtaining an OCR receipt template based on the pre-determined characteristic of the receipt, wherein the OCR receipt template specifies a relationship between a plurality of locations on the receipt and a plurality of pre-defined fields of the receipt, wherein the pre-determined characteristic of the receipt identifies none of a plurality of vendors associated with a plurality of OCR receipt templates, and wherein obtaining the OCR receipt template based on the pre-determined characteristic of the receipt comprises:

adding the receipt image into a plurality of receipt images to form a training set, wherein each of the plurality of receipt images comprises the pre-determined characteristic of the receipt, and generating the OCR receipt template based on a plurality of user inputs with respect to the plurality of receipt images, wherein the plurality of user inputs identifies the vendor;

extracting, based on at least the OCR receipt template, a vendor attribute from a portion of the receipt image, wherein the portion of the receipt image corresponds to a pre-defined field of the plurality of pre-defined fields of the receipt;

verifying, based on matching the vendor attribute to a vendor associated with the OCR receipt template, that the receipt is generated by the vendor and that the OCR receipt template is applicable to perform the OCR of the receipt image; and generating, in response to the verifying, a textual content of the receipt by processing the receipt image based at least on the OCR receipt template, wherein the textual content comprises a plurality of machine-encoded texts.

19. The non-transitory computer readable medium of claim 18, wherein the pre-determined characteristic of the receipt comprises at least one selected from a group consisting of a name and a logo of the vendor.

20. The non-transitory computer readable medium of claim 19, the instructions when executed by the computer processor further performing the method steps of:

displaying the textual content of the receipt to a user;

receiving, from the user and in response to displaying the textual content, a correction of the textual content;

adjusting, based on the correction, the OCR receipt template to generate an adjusted OCR receipt template; and performing the OCR of another generated by the vendor based on the adjusted OCR receipt template.

21. The non-transitory computer readable medium of claim 20, wherein the textual content comprises an incorrect value of at least one of the plurality of pre-defined fields corresponding to an incorrect location that is included in the plurality of locations specified by the OCR receipt template, wherein the correction comprises a correct value of the at least one of the plurality of pre-defined fields, and wherein adjusting the OCR receipt template comprises:

identifying a correct location within the receipt image where the correct value is found, and revising, based on the correct location within the receipt image, the incorrect location that is included in the plurality of locations specified by the OCR receipt template.

22. The non-transitory computer readable medium of claim 21, the instructions when executed by the computer processor further performing the method steps of:

receiving, from a plurality of users, a plurality of corrections of a plurality of textual contents generated from a plurality of receipt images of which the OCR template is verified to be applicable to perform the OCR;

determining a statistical range of the correct location based on the plurality of corrections, and wherein revising the incorrect location on the receipt is further based on the statistical range of the correct location.

23. The non-transitory computer readable medium of claim 18, the instructions when executed by the computer processor further performing the method steps of:

obtaining information of the vendor from a third party online source; and determining the match by comparing the vendor attribute and the information of the vendor, wherein the vendor attribute and the information of the vendor comprise at least one selected from a group consisting of a logo, an address, and a postal code of the vendor.

24. The non-transitory computer readable medium of claim 18, wherein the pre-determined characteristic of the receipt comprises a location pattern of a subset of the plurality of locations on the receipt, and wherein the subset of the plurality of locations corresponds to at least one selected from a group consisting of a date field, a currency amount field, and a postal code field of the plurality of pre-defined fields.

* * * * *